(12) United States Patent
Frechinger

(10) Patent No.: US 6,241,504 B1
(45) Date of Patent: Jun. 5, 2001

(54) INJECTION UNIT FOR AN INJECTION MOULDING MACHINE

(75) Inventor: Johannes Frechinger, Katsdorf (AT)

(73) Assignee: Engel Maschinenbau G.m.b.H., Schertberg (AT)

( * ) Notice: Subject to any disclaimer, the term of this patent is extended or adjusted under 35 U.S.C. 154(b) by 0 days.

(21) Appl. No.: 09/356,949

(22) Filed: Jul. 19, 1999

(30) Foreign Application Priority Data

Jul. 22, 1998 (AT) .................................................... 1263/98

(51) Int. Cl.$^7$ .................................................... B29C 45/18
(52) U.S. Cl. ............................................ 425/145; 425/574
(58) Field of Search .................................. 425/574, 145, 425/149, 150

(56) References Cited

U.S. PATENT DOCUMENTS 5,256,345 * 10/1993 Yokota .................................. 425/145
5,266,247 * 11/1993 Yokota .................................. 425/145
5,595,693 * 1/1997 Fujita et al. ......................... 425/145
5,733,486 * 3/1998 Hayasi et al. ....................... 425/145

FOREIGN PATENT DOCUMENTS

| 324680 | 9/1975 | (AT) . |
| 340677 | 12/1977 | (AT) . |
| 2302211 | 7/1974 | (DE) . |
| 4300835 | 7/1993 | (DE) . |

* cited by examiner

*Primary Examiner*—Tim Heitbrink
(74) *Attorney, Agent, or Firm*—Notaro & Michalos P.C.

(57) ABSTRACT

Injection unit for an injection moulding machine, with a housing (1) carrying a plasticising cylinder (2) and with a transverse support (8) arranged movably in the housing (1), which support is connected to a plasticising screw (9) mounted in a rotatable and longitudinally displaceable manner in the plasticising cylinder (2), wherein piston rods (6) projecting on both sides in the longitudinal direction of the injection unit are connected to the transverse member (8), the free ends of which (6a, 6b) each enter into a cylinder chamber (7a, 7b) in the manner of plungers.

3 Claims, 2 Drawing Sheets

INJECTION UNIT FOR AN INJECTION MOULDING MACHINE

FIELD AND BACKGROUND OF THE INVENTION

The present invention relates to an injection unit for an injection moulding machine with a housing carrying a plasticising cylinder and with a transverse support arranged movably in the housing, which transverse support is connected to a plasticising screw longitudinally displaceable and rotatably mounted in the plasticising cylinder.

During the preparation of the plastics material to be processed by means of such an injection unit, the plasticising screw mounted in the plasticising cylinder is put into rotary motion. The plastics material ready for injection then collects in front of the tip of the plasticising screw, wherein In the course of preparation said screw is continuously moved rearwards. In order to inject the prepared plastics into the mould, the plasticising screw in the plasticising cylinder must be moved back again to its initial position. A hydraulic mechanism is normally used for this. It is known to connect to the plasticising screw one or two pistons which can be pressurised on both sides. Such hydraulic mechanisms which are provided with pistons which can be pressurised on both sides with two piston rods are, however, very complex from a constructional viewpoint, On the one hand, three sealing points must be configured, two for the piston rod and one on the piston itself. On the other hand, it is necessary to finish the internal surface of the cylinder, in addition to the two piston rods, for example by honing, in order to obtain the necessary surface quality. In particular in the case of the cylinder, configured as a cast piece, this finishing often gives rise to problems.

The object of the invention Is therefore to constructively improve the hydraulic mechanism of an injection unit so that fabrication is simplified and is thereby more economical.

This is obtained according to the invention in that piston rods projecting on both sides in the longitudinal direction of the injection unit are connected to the transverse support, the free ends of which rods each enter into cylinder chambers in the manner of plungers.

The configuration of the hydraulic mechanism by means of plungers working in opposition results in a reduction of the masses moved during the injection process. In addition, compared to the state of the art, the piston sealing points are eliminated as well as the costly finishing of the internal cylinder surface.

In order to adapt to the different demands of the two directions of movement of the plasticising screw, it is advantageous when the free ends of the piston rods have different diameters. In this way the requirement for a differential system is also satisfied.

BRIEF DESCRIPTION OF THE DRAWINGS

Further features and details of the present invention will be evident from the following description of the drawings. In these is shown, in.

DESCRIPTION OF THE PREFERRED EMBODIMENTS

Figure 1:
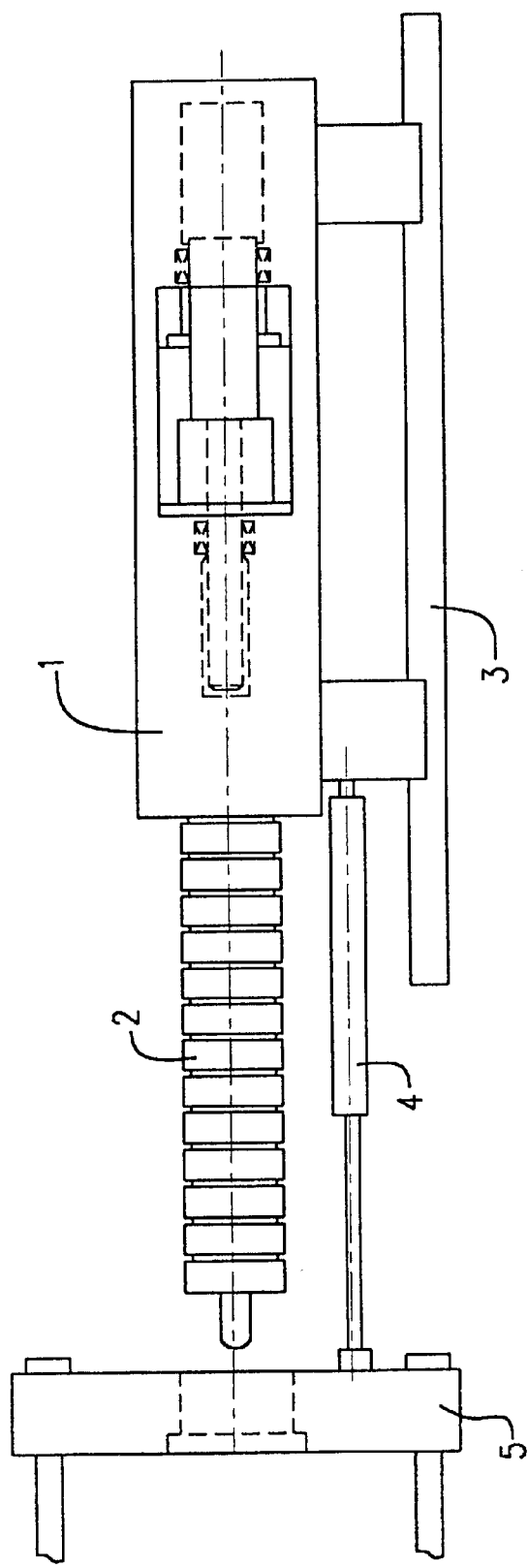
FIG. 1 a side view of an injection unit according to the invention.
Figure 2:
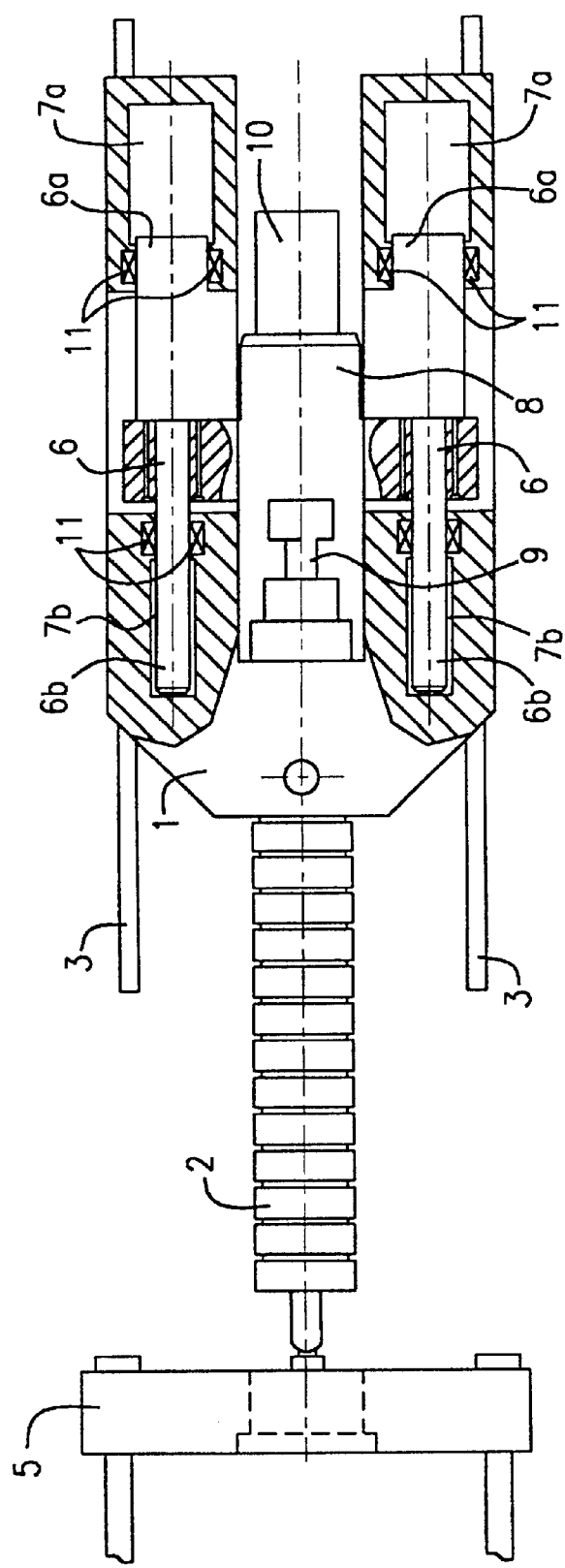
FIG. 2 the corresponding, partly cut away view from above.

The injection unit shown in the drawings is provided with a housing 1 which carries a plasticising cylinder 2 on its front side facing towards the stationary die platen 5. The plasticising cylinder 2 is provided with a row of strip heaters. The housing 1 is mounted on rails 3 such that it is slidable in the longitudinal direction of the injection unit, and can be brought forward to the stationary die platen 5 by means of the pressure cylinder 4 and fixed.

In the plasticising cylinder 2 a plasticising screw 9 is mounted in a rotatable and longitudinally displaceable manner. The plasticising screw 9 is solidly fixed by its rear end to a transverse support 8. This transverse support 8 carries a rotary actuator 10, by means of which the plasticising screw 9 can be put into In rotary motion. In addition two symmetrically arranged piston rods 6 are symmetrically connected to the transverse support 8. The piston rods 6 are configured with different diameters at their free ends 6a and 6b. Each of the free ends 6a and 6b, acting as plungers, of the pistons rods 6, respectively has a cylinder chamber 7a and respectively 7b assigned to it, which is sealed with seals 11.

When the plastics material to be processed is being prepared, the plasticising screw 9 is put into rotation by means of the rotary actuator 10 configured as a hydraulic motor, and is pushed slowly from the position shown towards the rear. With this, the plasticising screw 9 moves together with the transverse support 8 and the piston rods 6 relative to the housing 1 and the plasticising cylinder 2. During subsequent injection of the prepared plastics material, the cylinder chambers 7a are pressurised, wherein according to the demand for pressure and speed during the injection, the cylinder chambers 7b are connected either to a tank or differentially to the cylinder chambers 7a.

What is claimed is:

1. An injection unit for an injection molding machine having a housing carrying a plasticizing cylinder and a transverse support arranged movably in the housing, the transverse support being connected to a plasticizing screw mounted in a rotatable and longitudinally displaceable manner in the plasticizing cylinder, the injection unit comprising piston rods projecting longitudinally from both sides of the transverse support, each piston rod having a pair of free ends, the piston rods connected to the transverse support and the free ends of the piston rods each forming a plunger inside a respective cylinder chamber.

2. An injection unit according to claim 1, wherein the free ends of the piston rods have different diameters.

3. An injection unit according to claim 1, wherein each cylinder chamber is sealed against the corresponding piston rod free end by a single seal.

* * * * *